(12) United States Patent
Giri et al.

(10) Patent No.: US 9,213,178 B1
(45) Date of Patent: Dec. 15, 2015

(54) LENS WITH LIGHTGUIDE INSERT FOR HEAD WEARABLE DISPLAY

(71) Applicant: Google Inc., Mountain View, CA (US)

(72) Inventors: Sandeep Giri, Sunnyvale, CA (US); James Dunphy, San Jose, CA (US); Mark B. Spitzer, Sharon, MA (US); Hongqin Shi, San Jose, CA (US)

(73) Assignee: Google Inc., Mountain View, CA (US)

( * ) Notice: Subject to any disclaimer, the term of this patent is extended or adjusted under 35 U.S.C. 154(b) by 24 days.

(21) Appl. No.: 14/257,906

(22) Filed: Apr. 21, 2014

(51) Int. Cl.
*G02B 27/01* (2006.01)
*G02B 25/00* (2006.01)

(52) U.S. Cl.
CPC .......... *G02B 25/001* (2013.01); *G02B 27/0172* (2013.01)

(58) Field of Classification Search
CPC ............... G02B 25/001; G02B 27/017; G02B 27/0172; G02B 2027/0178; G02C 7/14; G02C 5/001
See application file for complete search history.

(56) References Cited

U.S. PATENT DOCUMENTS

| | | | |
|---|---|---|---|
| 6,474,809 B2 * | 11/2002 | Tanijiri et al. | 351/41 |
| 7,800,827 B2 | 9/2010 | Moliton et al. | |
| 8,665,178 B1 | 3/2014 | Wang | |
| 2014/0043688 A1 | 2/2014 | Schrader | |
| 2014/0062841 A1 | 3/2014 | Ishikawa et al. | |
| 2014/0098008 A1 | 4/2014 | Hatton | |

* cited by examiner

*Primary Examiner* — Joseph P Martinez
(74) *Attorney, Agent, or Firm* — Blakely Sokoloff Taylor & Zafman LLP

(57) ABSTRACT

An eyepiece for a head wearable display includes a first lens body having a first interface side in which a first recess is disposed and a second lens body having a second interface side in which a second recess is disposed. The first and second lens bodies are mated together along the first and second interface sides and the first and second recesses are aligned to form a cavity. A lightguide insert is provided that has a shape and a size to fit within the cavity defined by the first and second recesses. The lightguide insert includes an in-coupling region to receive display light into the lightguide insert and an out-coupling region to direct the display light out of the lightguide insert through the first lens body.

25 Claims, 8 Drawing Sheets

LENS WITH LIGHTGUIDE INSERT FOR HEAD WEARABLE DISPLAY

TECHNICAL FIELD

This disclosure relates generally to the field of optics, and in particular but not exclusively, relates to eyepieces for head wearable displays.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, field of view, eye box, and efficiency of conventional optical systems used to implemented existing HMDs. Another limiting factor to widespread adoption has been the ability to incorporate a prescriptive lens into HMD designs in a cost effective manner.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system, and method of fabrication of eyepieces including a lightguide insert for use with a head wearable display are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIGS. 1A-D illustrate perspective views of different aspects of an eyepiece 100 for use with a head wearable display, in accordance with an embodiment of the disclosure. The illustrated embodiment of eyepiece 100 includes lens body 105, lens body 110, and lightguide insert 115. The illustrated embodiments of lens body 105 includes an eyeward side 120 and an interface side 125 having a recess 130 disposed therein. The illustrated embodiment of lens body 110 includes an ambient scene side 135 and an interface side 140 having a recess 145 disposed therein. When lens bodies 105 and 110 are mated together along interface sides 125 and 140, respectively, recesses 130 and 145 form a cavity 150 having an opening 155 in external edge 160. The illustrated embodiment of lightguide insert 115 includes an in-coupling region 165, a relay region 170, and an out-coupling region 175.

Figure 1A:
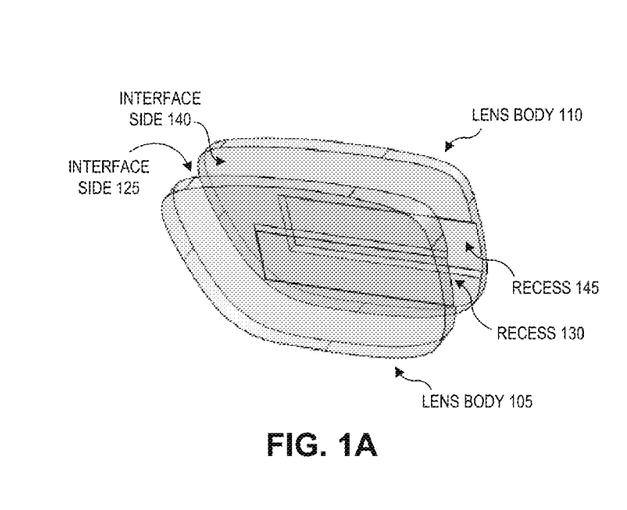
FIGS. 1A-D illustrate perspective views of different aspects of an eyepiece for use with a head wearable display, in accordance with an embodiment of the disclosure.

FIG. 1A illustrates lens bodies 105 and 110 prior to being mated along interface surfaces 125 and 140. In one embodiment, lens bodies 105 and 110 are injection molded using optical grade plastic (e.g., Zeonex, polycarbonate resin, etc.). Interface surfaces 125 and 140 may be flat planar surfaces, while one or both of eye-ward side 120 and ambient scene side 135 may be molded with a baseline curvature that is subsequently resurfaced to a prescribed curvature to provide a corrective lens shape. In another embodiment, lens bodies 105 and 110 may be fabricated from glass pucks and recesses 130 and 145 as well as curvatures on eye-ward side 120 and ambient scene side 135 etched/ground into the glass pucks.

Figure 1B:
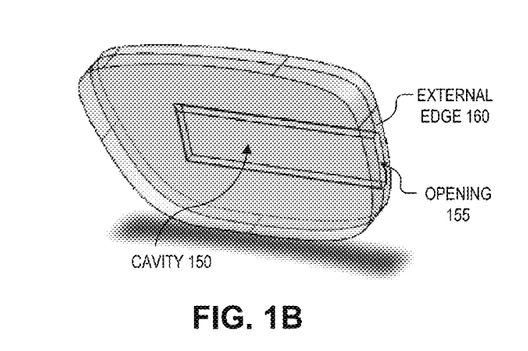

FIG. 1B illustrates the mating of lens bodies 105 and 110 along interfaces surfaces 125 and 140 into a single lens puck. Recesses 130 and 145 align with each other to define cavity 150 internal to the fused lens bodies 105 and 110. This mating may be achieved using clear adhesives, such as those provided by Norland Products, Inc. In the illustrated embodiment, cavity 150 extends through the central regions of lens bodies 105 and 110 to external edge 160 where opening 155 is defined. Opening 155 provides an orifice for lightguide insert 115 to be inserted into cavity 150.

Figure 1C:
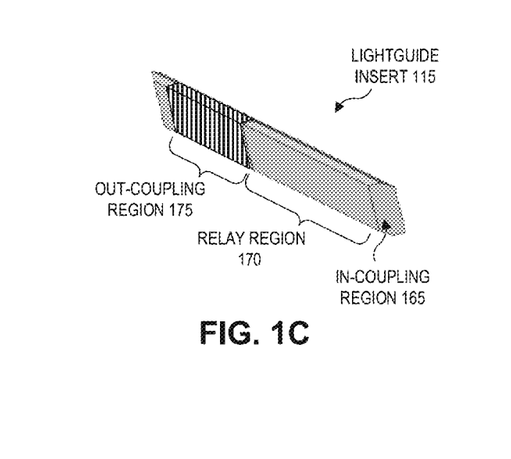
Figure 1D:
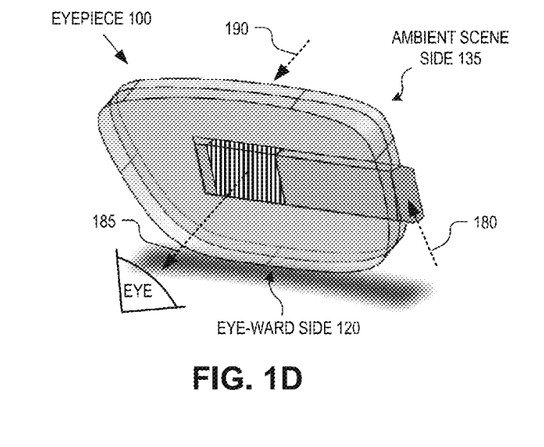

FIG. 1C illustrates an example lightguide insert 115, while FIG. 1D illustrates lightguide insert 115 fully inserted into cavity 150. When inserted, in-coupling region 165 is externally exposed providing a peripheral location for injecting display light 180 output from a display source (not illustrated) into a proximal end of lightguide insert 115. Lightguide insert 115 provides an optical pathway, which includes relay region 170, for display light 180 to be transported from a peripheral location outside of the user's central vision to out-coupling region 175 centrally located in front of the user's forward vision. Out-coupling region 175 operates to redirect display light 180 out through lens body 105 along an eye-ward direction 185. It should be appreciated that out-coupling region 175 need not be directly centered in front of the user's eye. Rather, embodiments may position out-coupling region 175 offset from the center of a user's pupil (e.g., slightly above the user's center of vision). As such, eye-ward direction 185 need not be a normal vector from the eye-ward side surface of lightguide insert 115.

In one embodiment, lens bodies 105 and 110 along with lightguide insert 115 are fabricate of clear materials. As such, ambient scene light 190 can pass through eyepiece 100 to the eye. Accordingly, eyepiece 100 servers to combine ambient scene light 190 with display light 180, and in some embodiments, provides an augmented reality where display light 180 includes computer generate images ("CGI").

In the illustrated embodiment, lightguide 115 is implemented as a planar lightguide. Lightguide insert 115 may be implemented using a variety of different light guiding or light bending technologies. For example, in-coupling region 165 may include an oblique facet or input prism for receiving display light 180 into lightguide 115. Thereafter, display light 180 may be guided along relay region 170 to out-coupling region 175 via total internal reflection ("TIR"). In some embodiments, display light 180 may be directed down relay region 170 without TIR off the eye-ward side and ambient scene side of lightguide insert 115. Out-coupling region 175 includes out-coupling optics that redirect display light 180 for emission along eye-ward direction 185. The out-coupling optics may include a single partially reflective element (e.g., an obliquely angled beam splitter or polarization beam splitter), a linear array of partially reflective elements (e.g., a layered parallelogram stack of dichroic or beam splitter facets), one or more diffractive optical elements (e.g., linear grating or hologram), or otherwise.

Figure 2A:
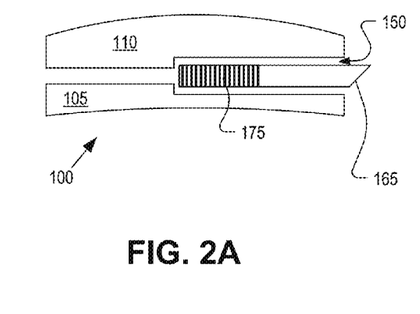
FIGS. 2A & 2B illustrate cross-sectional top views of an eyepiece, in accordance with an embodiment of the disclosure.
Figure 2B:
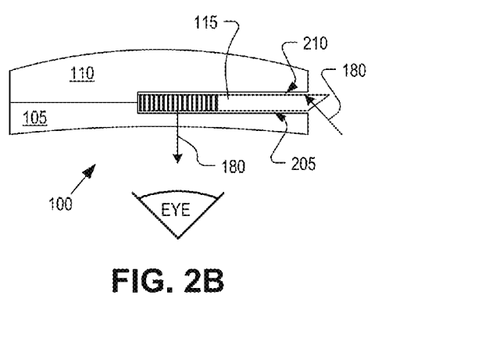

FIGS. 2A & 2B illustrate cross-sectional top views of eyepiece 100, in accordance with an embodiment of the disclosure. FIG. 2A is an illustration of lens bodies 105 and 110 prior to being mated together, while FIG. 2B is after they have been mated and lightguide insert 115 slid into cavity 150. As illustrated, lightguide insert 115 is held within cavity 150 with gaps 205 and 210 on either side to promote TIR of display light 180 from in-coupling region 165 to out-coupling region 175. In one embodiment, gaps 205 and 210 are air gaps that have a lower index of refraction than the material of lightguide insert 115, thereby forming a refractive index interface to support TIR within lightguide insert 115. In various embodiments, the gaps disclosed herein may be filled with a gas, liquid, or solid material that is clear and has an index of refraction below that of lightguide insert 115. In one embodiment, the gaps may be filled or replaced with a dichroic film material.

Figure 2C:
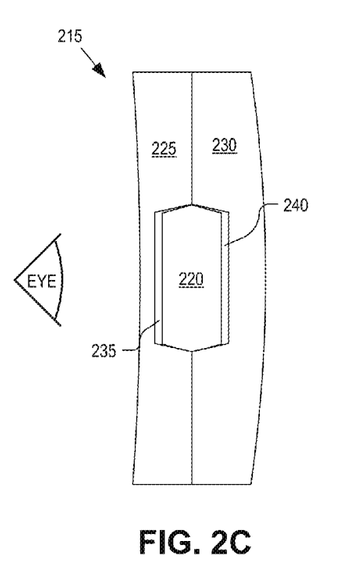
FIGS. 2C & 2D illustrates cross-sectional side views of eyepieces, in accordance with embodiments of the disclosure.

FIG. 2C is a cross-sectional side view of an eyepiece 215 that uses chamfered edges mated to beveled sides to align and hold a lightguide insert 220 within a cavity between lens bodies 225 and 230. Eyepiece 215 is one possible implementation of eyepiece 100. As illustrated the chamfered top and bottom edges of lightguide insert 220 mate with the beveled sides of the recesses in lens bodies 225 and 230. These oblique surfaces passively align lightguide insert 220 within the cavity and mechanically hold lightguide insert 220 such that the sides of lightguide insert 220 are offset from lens bodies 225 and 230 to maintain gaps 235 and 240. These gaps provide an index of refraction interface that promotes TIR within lightguide insert 220.

Figure 2D:
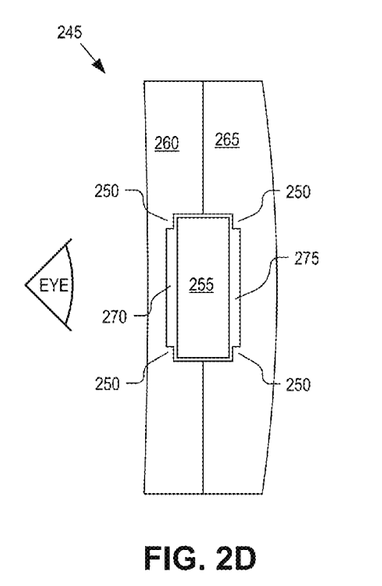

FIG. 2D is a cross-sectional side view of an eyepiece 245 that uses standoffs 250 to align and hold a lightguide insert 255 within a cavity between lens bodies 260 and 265. Eyepiece 245 is one possible implementation of eyepiece 100. In the illustrated embodiment, standoffs 250 are disposed around the edges of the recesses to hold corners of lightguide insert 255. Standoffs 250 passively align lightguide insert 255 within the cavity and mechanically hold lightguide insert 255 such that the sides of lightguide insert 255 are offset from lens bodies 260 and 265 to maintain gaps 270 and 275. These gaps provide an index of refraction interface that promotes TIR within lightguide insert 255.

Figure 3A:
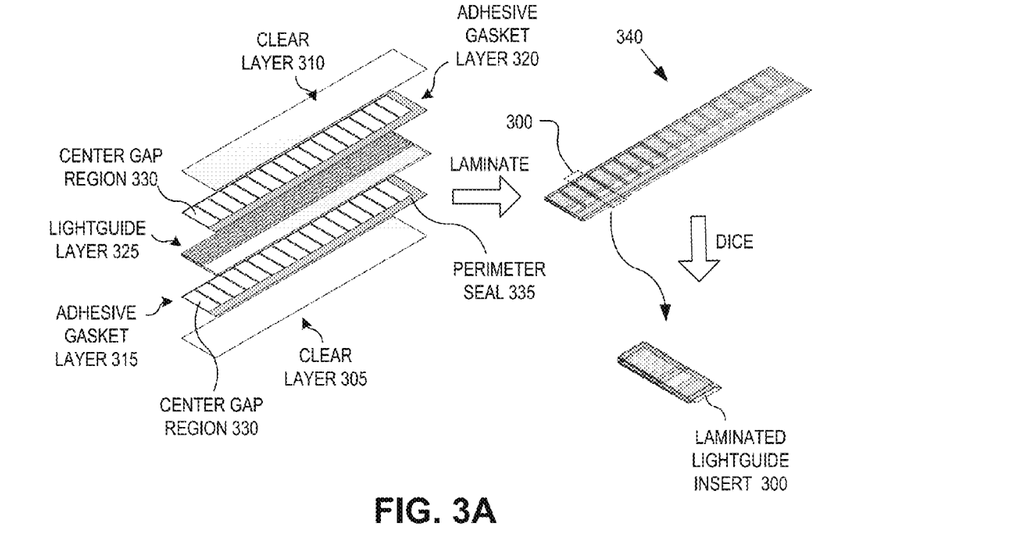
FIG. 3A illustrates perspective views of the assembly of a laminated lightguide insert, in accordance with an embodiment of the disclosure.

FIG. 3A illustrates perspective views of the assembly of a laminated lightguide insert 300, in accordance with an embodiment of the disclosure. Laminated lightguide insert 300 is one possible implementation of lightguide insert 115. Laminated lightguide insert 300 is designed with integrated TIR gaps, and thus, when used with the various eyepieces disclosed herein, gaps need not be designed into the interior surfaces of recesses 130 or 145. Rather, laminated lightguide insert 300 can have a cross-sectional size that precisely matches the cross-sectional size of cavity 150 without gaps there between.

FIG. 3A illustrates the multiple layers of laminated lightguide insert 300, in accordance with an embodiment of the disclosure. The illustrated embodiment of laminated lightguide insert 300 includes outer clear layers 305 and 310, adhesive gasket layers 315 and 320, which sandwich around a middle lightguide layer 325. The illustrated embodiment of adhesive gasket layers 315 and 320 both include a center gap region 330 surrounded by a perimeter seal 335. Multiple laminated lightguide inserts 300 may be fabricated as a linear array 340 that is diced into individual components (i.e., individual laminated lightguide inserts 300). Adhesive gasket layers 315 and 320 function as glued-on standoffs that protect and seal center gap regions 330 on either side of lightguide layer 325. Center gap regions 330 may be air gaps (or other gas may be used) that provide a refractive index interface to promote TIR within lightguide layer 325. Lightguide layer 325 may be fabricated using a variety of technologies for in-coupling and out-coupling optics, similar to those discussed above in connection with lightguide insert 115.

Figure 3B:
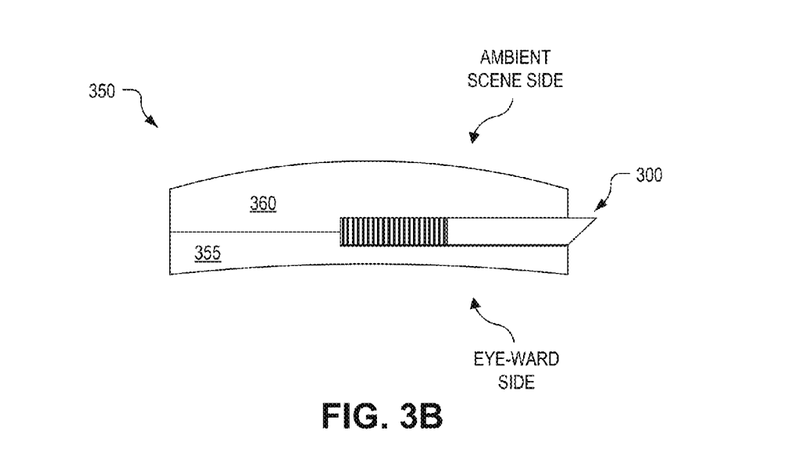
FIG. 3B illustrates a cross-sectional top view of an eyepiece including a laminated lightguide insert, in accordance with an embodiment of the disclosure.

FIG. 3B illustrates a cross-sectional top view of an eyepiece 350 including lens bodies 355 and 360 forming a cavity into which laminated lightguide insert 300 is inserted. Since laminated lightguide insert 300 includes integrated gaps, offsets or gaps need not be formed into lens bodies 355 or 360.

Figure 4A:
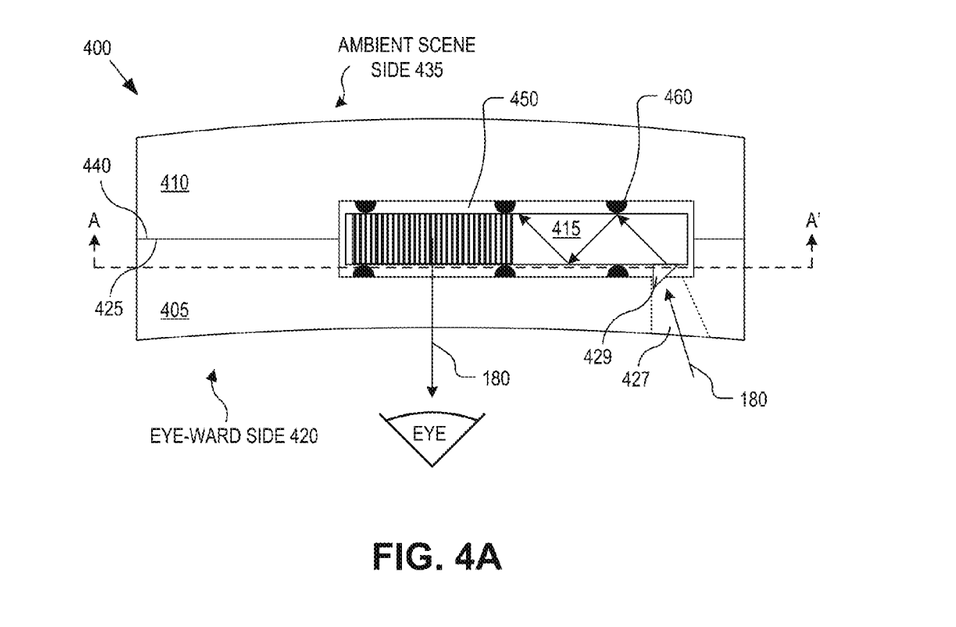
FIG. 4A illustrates a cross-sectional top view of an eyepiece, in accordance with an embodiment of the disclosure.
Figure 4B:
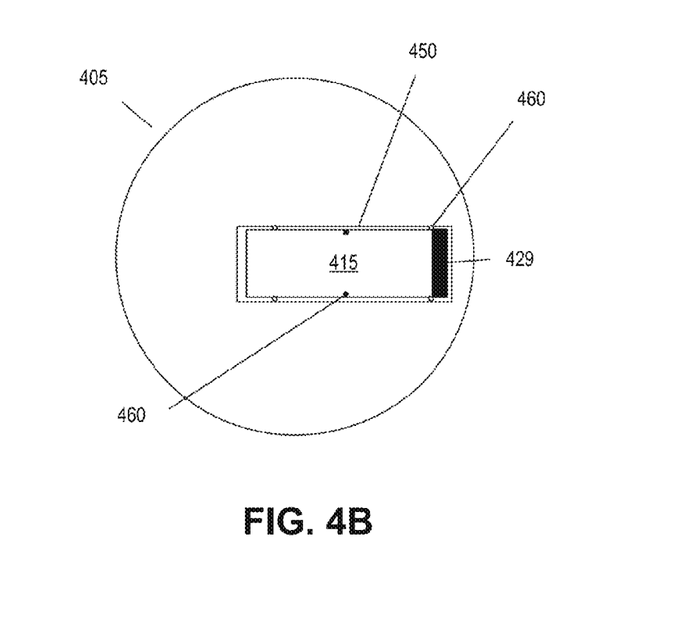
FIG. 4B illustrates a cross-sectional view along line A-A' in FIG. 4A of the eyepiece, in accordance with an embodiment of the disclosure.

FIGS. 4A and 4B illustrate aspects of yet another eyepiece 400 that provides coupling of display light 180 through an eye-ward side surface of the eyepiece, in accordance with an embodiment of the disclosure. FIG. 4B illustrates a cross-sectional view along line A-A' in FIG. 4A. The illustrated embodiment of eyepiece 400 includes lens body 405, lens body 410, and lightguide insert 415. The illustrated embodiment of lens body 405 includes an eye-ward side 420, an interface side 425 having a recess disposed therein, and through hole 427 disposed through eye-ward side 420 to the recess. The illustrated embodiment of lens body 410 includes an ambient scene side 435 and an interface side 440 having a recess disposed therein. When lens bodies 405 and 410 are mated together along interface sides 425 and 440, respectively, the recesses form a cavity 450 having a gap that provides a TIR interface. The gap may be maintained using standoffs 460. Standoffs 460 may be discreet add-on elements, or integrally molded into lens bodies 405 and 410. Of course, eyepiece 400 may be implemented with embodiments of laminated lightguide insert 300, and therefore need not include standoffs 460 to maintain gaps within cavity 450.

The illustrated embodiment of lightguide insert 415 may be implemented similar to lightguide insert 115 except that it is fully encased within cavity 450 and its in-coupling region is aligned with through hole 427 to receive display light 180. In other words, cavity 450 does not extend to the external edges of lens bodies 405 and 410. Rather, display light 180 is coupled into lightguide insert 415 via through hole 427. Additionally, an in-coupling optical element 429 (illustrated as a prism wedge) may be disposed within through hole 427 and mounted over the in-coupling region of lightguide insert 415.

The eyepieces described above describe structures capable of integrating internal light paths into an ophthalmic lens. An ophthalmic lens is a prescriptive lens for vision correction; however, these lens bodies may also include lenses with zero power. Zero-power lenses are worn for eye protection, as sunglasses, for purely cosmetic reasons, or for viewing display light 180 from a display source of a wearable computer.

Ophthalmic lenses go to market as a "semi-finished lens" which is round, nominally about 80 mm in diameter, and about 15 mm thick, and usually such lenses have optical power. Even though semi-finished lenses are surfaced on both sides, the standard process for installing lenses in eyewear frames involves resurfacing one or both surfaces to the specific curvature needed for the exact amount of vision correction. Resurfacing includes computer numerically controlled machining such as with diamond cutter and polishing, and in many cases optical coatings are applied. After resurfacing, the lenses are edge ground to create a shape compatible with the eye-ring on the eyeglass frame selected by the customer. The lens is then ready to be installed in the frame.

The eyepieces described above are amenable to the fabrication flow of ophthalmic lenses. They can be manufactured as a semi-finished lens that has been provided with an embedded optical element (e.g., lightguide inserts 115, 220, 255, 300, or 415). The semi-finished lens is suitable for ophthalmic lens installers to surface, edge, coat, and install in specific frames intended for wearable computers. By providing a semi-finished lens, existing ophthalmic channels can install, remove, and replace lenses using methods similar to their existing methods.

Figure 5:
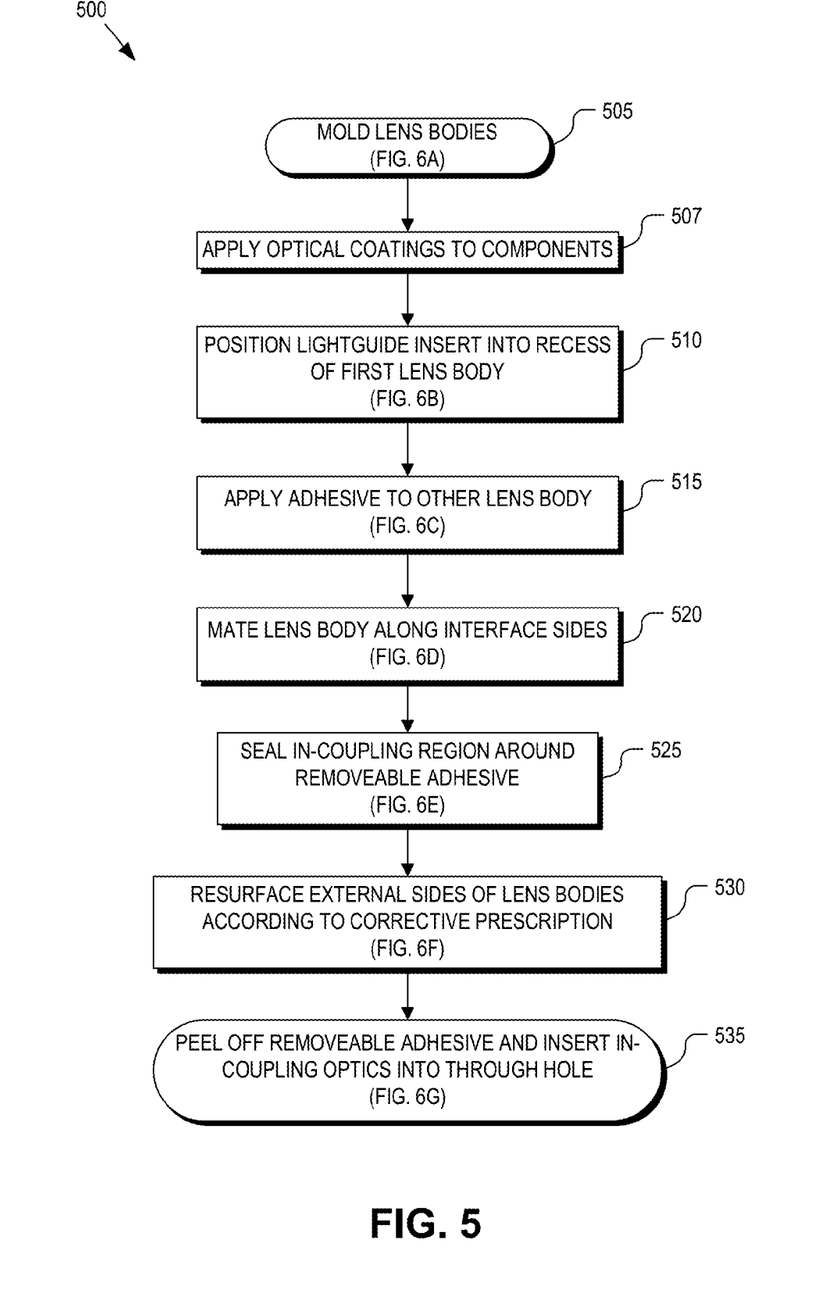
FIG. 5 is a flow chart illustrating a process for fabricating an eyepiece, in accordance with an embodiment of the disclosure.

FIG. 5 is a flow chart illustrating a process 500 for fabricating eyepiece 400, in accordance with an embodiment of the disclosure. Process 500 is described with reference to FIGS. 6A-6G. While process 500 is described using eyepiece 400 as the example, it should be appreciated that it is generally applicable to fabricating eyepieces 100, 215, 245, and 300, with modifications to address the differences between the various embodiments. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

Figure 6A:
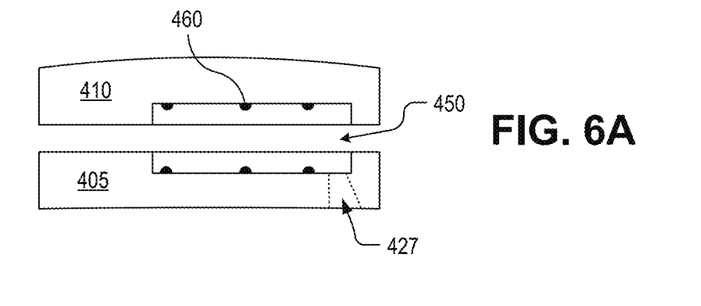
FIGS. 6A-6G illustrate various stages of fabricating an eyepiece, in accordance with an embodiment of the disclosure.

In a process block 505, fabrication begins by injection molding the two semi-finished lens bodies 405 and 410. Of course, lens bodies 405 and 410 may alternative be fabricated using machining and polishing techniques as opposed to injection molding. Lens bodies 405 and 410 may be fabricated of polycarbonate resin, Zeonex, or other optical grade plastics. FIG. 6A is a cross sectional diagram of a semi-finished lens formed by lens bodies 405 and 410, in which a cavity 450 has been formed between the two components. Lens body 405 includes an opening or through hole 427 through which display light 180 from a display source may enter, or within which further optics may be placed.

In a process block 507, optical coatings are applied to the lens bodies 405 and 410 as well as lightguide insert 415. For example, an anti-reflective ("AR") coating may be applied to the recesses that form cavity 450. AR coatings may include magnesium fluoride, alternating stacks of silicon dioxide and aluminum oxide, or other thin film coatings. Additionally, a protective film may be applied to lightguide insert 415.

Figure 6B:
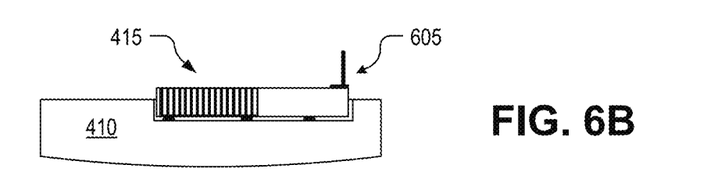

In a process block 510, lightguide insert 415 is positioned within the recess of lens body 410 (see FIG. 6B). In one embodiment, the surface of the in-coupling region of lightguide insert 415 may be covered with a removable adhesive 605 (e.g., sticker with a pull tab) so that the in-coupling region is protected during the subsequent surface and edge grinding processes. In one embodiment, removable adhesive 605 may be implemented as a sacrificial material that is selectively dissolved, as opposed to a stick and peel material. The shape of the cavity 450 may be cylindrical, rectangular, conical or other complex shape depending on the ray bundle and the desired direction of entry into the lightguide insert 415, or depending on the optical parts that are intended to be positioning in the cavity 450.

Lightguide insert 415 may be suspended within cavity 450 by small spacers or standoffs 460 on both sides. Standoffs 460 prevent significant contact between the lightguide insert 415 and lens bodies 405 and 410. In this way, TIR in lightguide insert 415 is maintained. As previously mentioned, standoffs 460 can be molded into lens bodies 405 and 410 and may be sufficiently compressible that the lightguide insert 415 is held rigidly within cavity 450. Although the figures illustrate cavity 450 formed from recesses in both lens bodies 405 and 410, in other embodiments, cavity 450 is formed completely in one lens body and the other lens body is flat along the interface surface. Embodiments are contemplated where cavity 450 is at any depth and position between lens bodies 405 and 410.

Figure 6C:
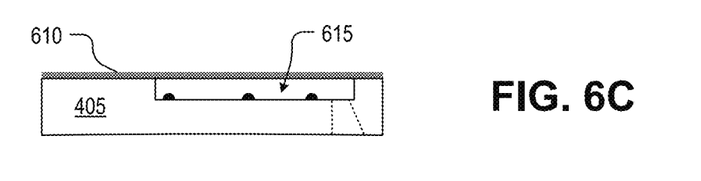

In a process block 515, an adhesive 610 is applied to the interface surface of lens body 405 (see FIG. 6C). Adhesive 610 may be patterned to ensure it does not enter into recess 615 or come in contact with lightguide insert 415 when the lens bodies are joined. Lens bodies 405 and 410 may be joined together by other means as well, such as fusion bonding. However, the adhesive bond may be thin if the process is carried out in a clean environment and interfaces surfaces 425 and 440 are sufficiently parallel and true. Many optical adhesives, such as those sold by Norland Products, Inc., are known in the art.

Figure 6D:
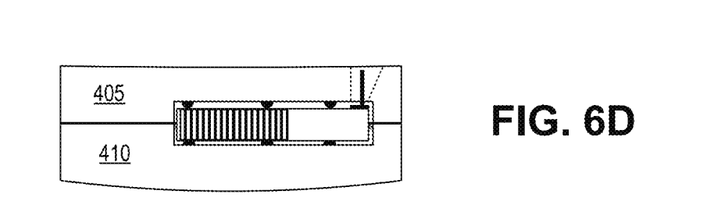
Figure 6E:
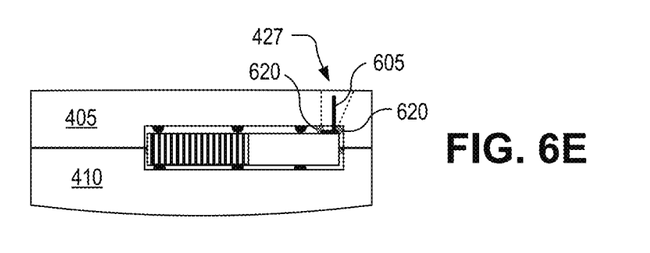
Figure 6F:
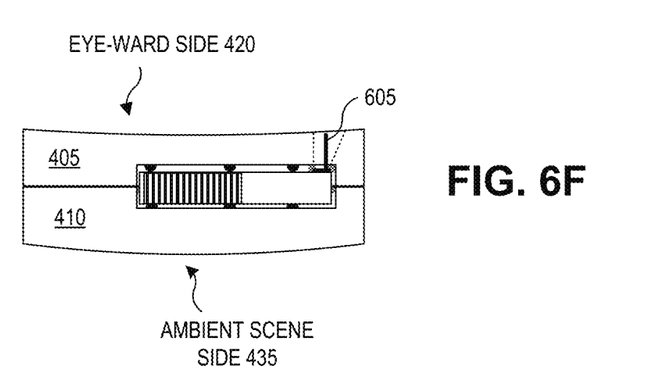
Figure 6G:
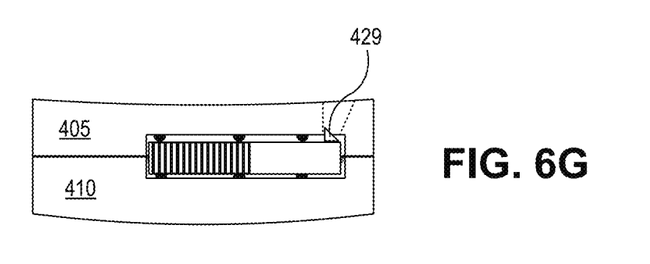

In a process block 520, the two lens bodies are mated together along interface sides 425 and 440 using the thin layer of adhesive 610 (see FIG. 6D). In one embodiment, lens body 410 is held flat in a chuck with its interface side facing upward. Lens body 405 may be held by vacuum to a chuck with the adhesive surface facing downward. The two lens bodies are brought into proximity and aligned. The interfaces sides are then held slightly non-parallel and slowly brought into contact taking care to seat lightguide insert 415 within the standoffs of lens body 405. The non-parallel orientation may be used to facilitate contact at one edge, followed by slow closure of the gap to avoid gas entrapment and formation of bubbles in adhesive 610. In order to further reduce bubble formation, adhesive 610 may be cured under pressure. In one embodiment, the lens bodies 405 and 410 may be mated together in a vacuum. Of course other mating techniques may be implemented.

In a process block 525 (see FIG. 6E), cavity 450 is sealed with a sealant 620 (e.g., bead of epoxy) around removeable adhesive 605 in the bottom of through hole 427. This sealant 620 prevent contaminants from entering into cavity 405 during the subsequent fabrication steps.

In a process block 530, eye-ward side 420 and/or ambient scene side 435 are resurfaced to apply a patient specific corrective prescription. Resurfacing may include machining and polishing (see FIG. 6F). Finally, in a process block 535, the removeable adhesive 605 is pulled out via through hole 427 by grabbing its pull off tab. This exposes a clean in-coupling region of lightguide insert 415. In some embodiments, in-coupling optical element 429 is inserted into through hole 427 to facilitate the injection of display light 180 into lightguide insert 415 (see FIG. 6G).

Figure 7:
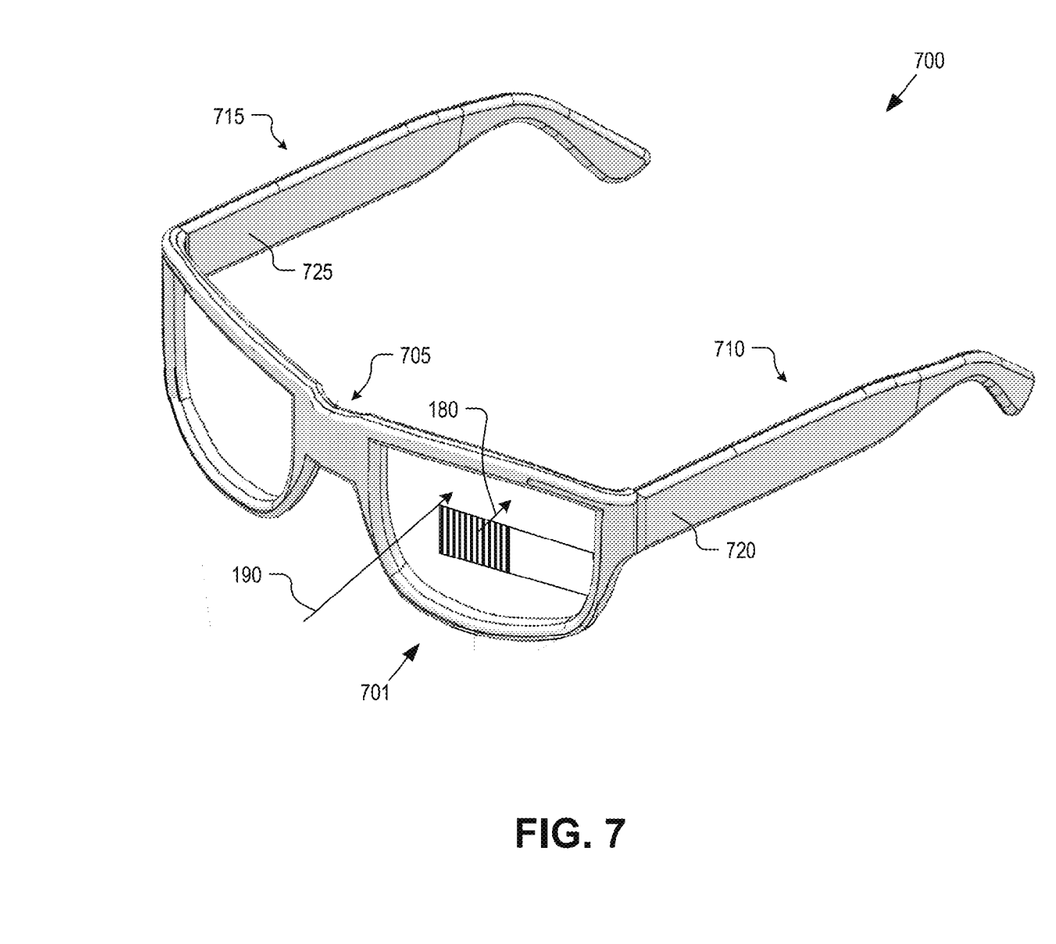
FIG. 7 is a perspective view of a demonstrative head wearable display, in accordance with an embodiment of the disclosure.

FIG. 7 illustrates a head wearable display 700 including an eyepiece 701, in accordance with an embodiment of the disclosure. Eyepiece 701 may be implemented with embodiments or various combinations of eyepieces 100, 215, 245, 350, or 400 as discussed above. Eyepiece 701 is mounted to a frame assembly, which includes a nose bridge 705, left ear arm 710, and right ear arm 715. Housings 720 and 725 may contain various electronics including a microprocessor, interfaces, one or more wireless transceivers, a battery, a camera, a speaker, a display source, etc. Although FIG. 7 illustrates a monocular embodiment, head wearable display 700 may also be implemented as a binocular display with two eyepieces 701 each aligned with a respective eye of the user when display 700 is worn.

Eyepiece 701 is secured into an eye glass arrangement or head wearable display that can be worn on the head of a user. The left and right ear arms 710 and 715 rest over the user's ears while nose bridge 705 rests over the user's nose. The frame assembly is shaped and sized to position the out-coupling region of the lightguide insert in front of an eye of the user. Other frame assemblies having other shapes may be used (e.g., traditional eyeglasses frame, a single contiguous headset member, a headband, goggles type eyewear, etc.).

The illustrated embodiment of head wearable display 700 is capable of displaying an augmented reality to the user. The see-through nature permits the user to see a real world image via ambient scene light 190. Display light 180 may be generated by a display sources mounted peripherally within housing 720 outside the user's central vision near their temple. Display light 180 is seen by the user as a virtual image superimposed over ambient scene light 190 as an augmented reality. In some embodiments, ambient scene light 190 may be fully, partially, or selectively blocked to provide sun shading characteristics and increase the contrast of display light 180.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head wearable display, comprising:
   a first lens body having a first interface side in which a first recess is disposed;
   a second lens body having a second interface side in which a second recess is disposed, wherein the first and second lens bodies are mated together along the first and second interface sides and the first and second recesses are aligned to form a cavity; and
   a lightguide insert having a shape and a size to fit within the cavity defined by the first and second recesses, the lightguide insert including:
      an in-coupling region to receive display light into the lightguide insert;
      an out-coupling region to direct the display light out of the lightguide insert through the first lens body along an eye-ward direction; and
      a relay region along which the display light propagates from the in-coupling region to the out-coupling region.

2. The eyepiece of claim 1, wherein the lightguide insert comprises a planar lightguide and wherein the relay region of the lightguide insert guides the display light between the in-coupling region and the out-coupling region via total internal reflection.

3. The eyepiece of claim 2, further comprising:
   a first gap disposed between an eye-ward side of the lightguide insert and the first lens body; and
   a second gap disposed between an ambient scene side of the lightguide insert and the second lens body, wherein the first and second gaps provide an index of refraction interface that promotes total internal reflection along the relay region.

4. The eyepiece of claim 3, wherein top and bottom edges of the lightguide insert are chamfered to mate with beveled sides of the first and second recesses, wherein the mechanical mating between the chamfered top and bottom edges and the beveled sides aligns the lightguide insert such that the eye-ward side and the ambient scene side of the lightguide insert are offset from the first and second lens bodies, respectively, to form the first and second gaps.

5. The eyepiece of claim 3, wherein interior corners of the first and second recesses include standoffs to mechanically hold the lightguide insert within the cavity with the eye-ward side and the ambient scene side of the lightguide insert offset from the first and second lens bodies, respectively, to form the first and second gaps.

6. The eyepiece of claim 2, wherein the lightguide insert comprises a laminated lightguide insert including:
   a lightguide layer having an eye-ward side and an ambient scene side;
   first and second adhesive gasket layers each adhered to a corresponding side of the lightguide layer, the first and second gasket layers each patterned to form a perimeter seal around a center gap region;
   a first clear layer adhered to the first adhesive gasket layer to seal the center gap region over the eye-ward side of the lightguide layer;
   a second clear layer adhered to the second adhesive gasket layer to seal the center gap region over the ambient scene side of the lightguide layer, wherein the gap regions provide an index of refraction interface that promotes total internal reflection within the lightguide layer.

7. The eyepiece of claim 1, wherein the cavity extends to an external edge of the first and second lens bodies to form an opening through which the lightguide insert is removable.

8. The eyepiece of claim 7, wherein the lightguide insert extends outside of the cavity past the opening in the external edge when fully inserted into the cavity such that the in-coupling region is externally exposed when the lightguide is fully inserted into the cavity.

9. The eyepiece of claim 8, wherein the in-coupling region comprises a beveled end of the lightguide insert.

10. The eyepiece of claim 1, wherein the first lens body includes a hole that extends from an eye-ward side of the first lens body through to the cavity and aligns with the in-coupling region of the lightguide insert.

11. The eyepiece of claim 10, wherein the first and second lens bodies include standoffs disposed on inner surfaces of the first and second recesses to hold the lightguide insert offset with gaps between the first and second lens bodies and the lightguide insert to provide index of refraction interfaces that promote total internal reflection within the lightguide insert.

12. The eyepiece of claim 10, further comprising a removable adhesive disposed over the in-coupling region of the lightguide insert that is removeable through the hole to protect the in-coupling region while a prescriptive curvature is formed into an exterior surface of at least one of the first or second lens bodies.

13. The eyepiece of claim 1, wherein an eye-ward side of the first lens body has a first curvature and an ambient scene side of the second lens body has a second curvature, wherein the first and second curvatures of the first and second lens bodies form a corrective lens.

14. The eyepiece of claim 1, wherein the out-coupling region of the eyepiece insert comprises one of a partially reflective element, a linear array of partially reflective elements, or a diffractive optical element.

15. A head wearable display, comprising:
a display source to generate display light;
an eyepiece, including:
   a first lens body having a first interface side in which a first recess is disposed;
   a second lens body having a second interface side in which a second recess is disposed, wherein the first and second lens bodies are mated together along the first and second interface sides and the first and second recesses are aligned to form a cavity; and
   a lightguide insert disposed within the cavity defined by the first and second recesses, the lightguide insert including an in-coupling region aligned to receive the display light and an out-coupling region to direct the display light out of the lightguide insert through the first lens body; and
a frame assembly to support the display source and the eyepiece for wearing on a head of a user with the out-coupling region positioned in front of an eye of the user.

16. The head wearable display of claim 15, further comprising:
a first gap disposed between an eye-ward side of the lightguide insert and the first lens body; and
a second gap disposed between an ambient scene side of the lightguide insert and the second lens body, wherein the first and second gaps provide an index of refraction interface that promotes total internal reflection.

17. The head wearable display of claim 16, wherein top and bottom edges of the lightguide insert are chamfered to mate with beveled sides of the first and second recesses, wherein the mechanical mating between the chamfered top and bottom edges and the beveled sides aligns the lightguide insert such that the eye-ward side and the ambient scene side of the lightguide insert are offset from the first and second lens bodies, respectively, to form the first and second gaps.

18. The head wearable display of claim 16, wherein interior corners of the first and second recesses include standoffs to mechanically hold the lightguide insert within the cavity with the eye-ward side and the ambient scene side of the lightguide insert offset from the first and second lens bodies, respectively, to form the first and second gaps.

19. The head wearable display of claim 15, wherein the lightguide insert comprises a laminated lightguide insert including:
a lightguide layer having an eye-ward side and an ambient scene side;
first and second adhesive gasket layers each adhered to a corresponding side of the lightguide layer, the first and second gasket layers each patterned to form a perimeter seal around a center gap region;
a first clear layer adhered to the first adhesive gasket layer to seal the center gap region over the eye-ward side of the lightguide layer;
a second clear layer adhered to the second adhesive gasket layer to seal the center gap region over the ambient scene side of the lightguide layer, wherein the gap regions provide an index of refraction interface that promotes total internal reflection within the lightguide layer.

20. The head wearable display of claim 15, wherein the cavity extends to an external edge of the first and second lens bodies to form an opening through which the lightguide insert is removable.

21. The head wearable display of claim 15, wherein the first lens body includes a hole that extends from an eye-ward side of the first lens body through to the cavity and aligns with the in-coupling region of the lightguide insert.

22. The head wearable display of claim 21, further comprising a removable adhesive disposed over the in-coupling region of the lightguide insert that is removeable through the hole to protect the in-coupling region while a prescriptive curvature is formed into an exterior surface of at least one of the first or second lens bodies.

23. An eyepiece for a head wearable display, comprising:
a first lens body having a first interface side;
a second lens body having a second interface side in which a recess is disposed, wherein the first and second lens bodies are mated together along the first and second interface sides to form a cavity at the recess;
a lightguide insert having a shape and a size to fit within the cavity, the lightguide insert including:
   an in-coupling region to receive display light into the lightguide insert; and
   an out-coupling region to direct the display light out of the lightguide insert through either the first lens body or the second lens body along an eye-ward direction;
a first gap disposed between an eye-ward side of the lightguide insert and the first lens body; and
a second gap disposed between an ambient scene side of the lightguide insert and the second lens body, wherein the first and second gaps provide an index of refraction interface that promotes total internal reflection.

24. The eyepiece of claim 23, wherein the lightguide insert comprises a planar lightguide and wherein the lightguide insert guides the display light between the in-coupling region and the out-coupling region via total internal reflection.

25. An eyepiece for a head wearable display, comprising:
a first lens body having a first interface side;
a second lens body having a second interface side in which a recess is disposed, wherein the first and second lens bodies are mated together along the first and second interface sides to form a cavity at the recess; and
a lightguide insert having a shape and a size to fit within the cavity, the lightguide insert including:
  an in-coupling region to receive display light into the lightguide insert;
  an out-coupling region to direct the display light out of the lightguide insert through either the first lens body or the second lens body along an eye-ward direction; and
  a dichroic coating disposed on an eye-ward side and an ambient scene side of the lightguide insert to promote reflections of the display light down the lightguide insert.

\* \* \* \* \*